(12) United States Patent
Zibuschka et al.

(10) Patent No.: US 10,356,067 B2
(45) Date of Patent: Jul. 16, 2019

(54) DEVICE AND METHOD FOR PROVIDING USER-CONFIGURED TRUST DOMAINS

(71) Applicant: Robert Bosch GmbH, Stuttgart (DE)

(72) Inventors: Jan Zibuschka, Magstadt (DE); Joao P. Sousa, Pittsburgh, PA (US); Stefan Schmid, Waiblingen (DE); Rishabh Gulati, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 216 days.

(21) Appl. No.: 15/341,727

(22) Filed: Nov. 2, 2016

(65) Prior Publication Data
US 2018/0124029 A1    May 3, 2018

(51) Int. Cl.
*G06F 21/00*    (2013.01)
*G06F 3/0482*    (2013.01)
(Continued)

(52) U.S. Cl.
CPC .......... *H04L 63/065* (2013.01); *G06K 7/1417* (2013.01); *G06K 19/06037* (2013.01); *H04L 9/0822* (2013.01); *H04L 9/3268* (2013.01); *H04L 12/2803* (2013.01); *H04L 63/0435* (2013.01); *H04L 63/062* (2013.01); *H04L 63/064* (2013.01); *H04L 63/0823* (2013.01); *H04W 12/04* (2013.01)

(58) Field of Classification Search
CPC ............ G06K 19/06037; G06K 7/1417; H04L 12/2803; H04L 63/0435; H04L 63/062; H04L 63/064; H04L 63/065; H04L 63/0823; H04L 9/0822; H04L 9/3268; H04W 12/04
See application file for complete search history.

(56) References Cited

U.S. PATENT DOCUMENTS 9,071,967 B1 * 6/2015 Davies ................. H04W 12/06
2003/0044020 A1 * 3/2003 Aboba ................... H04L 63/04
380/278
(Continued)

FOREIGN PATENT DOCUMENTS

WO    2015150735 A1    10/2015

OTHER PUBLICATIONS

International Search Report corresponding to International Patent Application No. PCT/EP2017/076043 (5 pages).
(Continued)

*Primary Examiner* — Michael Simitoski
(74) *Attorney, Agent, or Firm* — Maginot Moore & Beck LLP (57) ABSTRACT

A method of operating a first device in group of devices in a network is disclosed. The method comprises encrypting and decrypting, with a processor of the first device, communications with other devices in the group of devices using a shared key that is stored in a memory of each device in the group of devices; receiving, with a transceiver of the first device, a first message from a second device in the group of devices, the first message indicating that the first device is authorized to share the shared key; and transmitting, with the first device, the shared key to a third device in the network that is not in the first group of devices only after receiving the first message indicating that the first device is authorized to share the shared key.

10 Claims, 7 Drawing Sheets

(51) Int. Cl.
*H04L 29/06* (2006.01)
*H04L 9/32* (2006.01)
*G06K 7/14* (2006.01)
*G06K 19/06* (2006.01)
*H04L 9/08* (2006.01)
*H04W 12/04* (2009.01)
*H04L 12/28* (2006.01)

(56) References Cited

U.S. PATENT DOCUMENTS

| | | | |
|---|---|---|---|
| 2003/0233538 A1 | 12/2003 | Dutertre | |
| 2004/0073516 A1* | 4/2004 | Yamamichi | G06F 21/10 705/57 |
| 2006/0045100 A1* | 3/2006 | Klausberger | H04L 47/10 370/400 |
| 2006/0080352 A1* | 4/2006 | Boubez | H04L 63/08 |
| 2011/0083169 A1* | 4/2011 | Moeller | H04L 63/0853 726/5 |
| 2012/0096560 A1* | 4/2012 | Selander | G06F 21/10 726/26 |
| 2012/0158981 A1* | 6/2012 | Desai | H04L 67/1093 709/230 |
| 2013/0014232 A1* | 1/2013 | Louboutin | H04M 1/72527 726/5 |
| 2013/0219010 A1 | 8/2013 | Mahendran et al. | |
| 2013/0288692 A1 | 10/2013 | Dupray et al. | |
| 2014/0074923 A1* | 3/2014 | Vasudevan | G06F 21/10 709/204 |
| 2014/0112222 A1* | 4/2014 | Park | H04W 4/08 370/311 |
| 2014/0164776 A1* | 6/2014 | Hook | H04L 9/14 713/171 |
| 2015/0124791 A1* | 5/2015 | Mazandarany | H04W 76/11 370/338 |
| 2015/0124969 A1* | 5/2015 | Wong | H04L 9/006 380/281 |
| 2015/0229475 A1* | 8/2015 | Benoit | H04L 9/14 713/168 |
| 2016/0105485 A1* | 4/2016 | Desai | H04L 67/1093 709/227 |
| 2016/0295413 A1* | 10/2016 | Liu | H04W 4/08 |
| 2016/0337453 A1* | 11/2016 | Lee | G06F 8/38 |
| 2016/0360407 A1* | 12/2016 | Benoit | H04W 12/06 |
| 2017/0026182 A1* | 1/2017 | Sauerwald | G06F 21/44 |
| 2018/0109381 A1* | 4/2018 | Cammarota | H04L 9/0838 |
| 2018/0181385 A1* | 6/2018 | Riedl | H04L 63/0428 |

OTHER PUBLICATIONS

"Wi-Fi Device Provisioning Protocol (DPP) Technical Specification Version 0.0.23", WiFi Alliance, 2016 (89 pages).

Bhattacharjee, M., "Share your Wi-Fi SSID & Password using a QR Code," Retrieved from Internet: http://www.technostarry.com/share-wi-fi-details-using-qr-code/, Jul. 19, 2015 (14 pages).

Pierre De Leusse, Panos Periorellis, Theo Dimitrakos, and Srijith Krishnan Nair. Self managed security cell, a security model for the internet of things and services. Advances in Future Internet, 2009 First International Conference on, 2009.

Jason I. Hong and James A. Landay. An architecture for privacy-sensitive ubiquitous computing. Proceedings of the 2nd international conference on Mobile systems, applications, and services, MobiSys '04, New York, NY, USA, 2004. ACM.

Apu Kapadia, Tristan Henderson, Jeffrey J. Fielding, and David Kotz. Virtual walls: Protecting digital privacy in pervasive environments. In Anthony LaMarca, Marc Langheinrich, and Khai N. Truong, editors, Pervasive Computing, vol. 4480 of Lecture Notes in Computer Science, pp. 162-179. Springer Berlin Heidelberg, 2007.

* cited by examiner

DEVICE AND METHOD FOR PROVIDING USER-CONFIGURED TRUST DOMAINS

FIELD

The device and method disclosed in this document relates to information security and, more particularly, to providing trust domains for devices in a network.

BACKGROUND

In recent years, the number of devices having network connectivity has increased substantially and it is predicted that, in the future, even the most mundane objects will have embedded network connectivity. The so-called "Internet of Things" (IoT) is a network of physical devices, such as machines, portable computers, and vehicles, which include embedded electronics and software that enables them to communicate with one another directly and indirectly. These networks may also include sensors for collecting data and actuators for performing certain control functions. Networks of such devices have near endless applications such as in home automation, industrial automation, automobiles, electrical grids, and healthcare.

One challenge that exists is with respect to establishing and maintaining effective security and privacy for communications between devices in the IoT. At least some of the devices in a system will often have very constrained processing power and memory, with little to no capability for direct human-machine interface. Accordingly, many traditional methods for establishing and maintaining secure communications between devices are not user-friendly, practical, or feasible. Accordingly, it would be advantageous to provide a user-friendly method of establishing secure communications between devices of a particular system.

SUMMARY

A method of operating a first device in group of devices in a network is disclosed. The method comprises encrypting and decrypting, with a processor of the first device, communications with other devices in the group of devices using a shared key that is stored in a memory of each device in the group of devices; receiving, with a transceiver of the first device, a first message from a second device in the group of devices, the first message indicating that the first device is authorized to share the shared key; and transmitting, with the first device, the shared key to a third device in the network that is not in the first group of devices only after receiving the first message indicating that the first device is authorized to share the shared key.

A first device is disclosed. The first device comprises a transceiver configured to communicate with other devices in a network; and a processor operably connected to the transceiver and configured to: encrypt and decrypt communications with other devices in a group of devices in the network using a shared key that is stored in a memory of each device in the group of devices; operate the transceiver to receive a first message from a second device in the group of devices, the first message indicating that the first device is authorized to share the shared key; and transmit the shared key to a third device in the network that is not in the first group of devices only after receiving the first message indicating that the first device is authorized to share the shared key.

BRIEF DESCRIPTION OF THE DRAWINGS

The foregoing aspects and other features of the method and system are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

Figure 1:
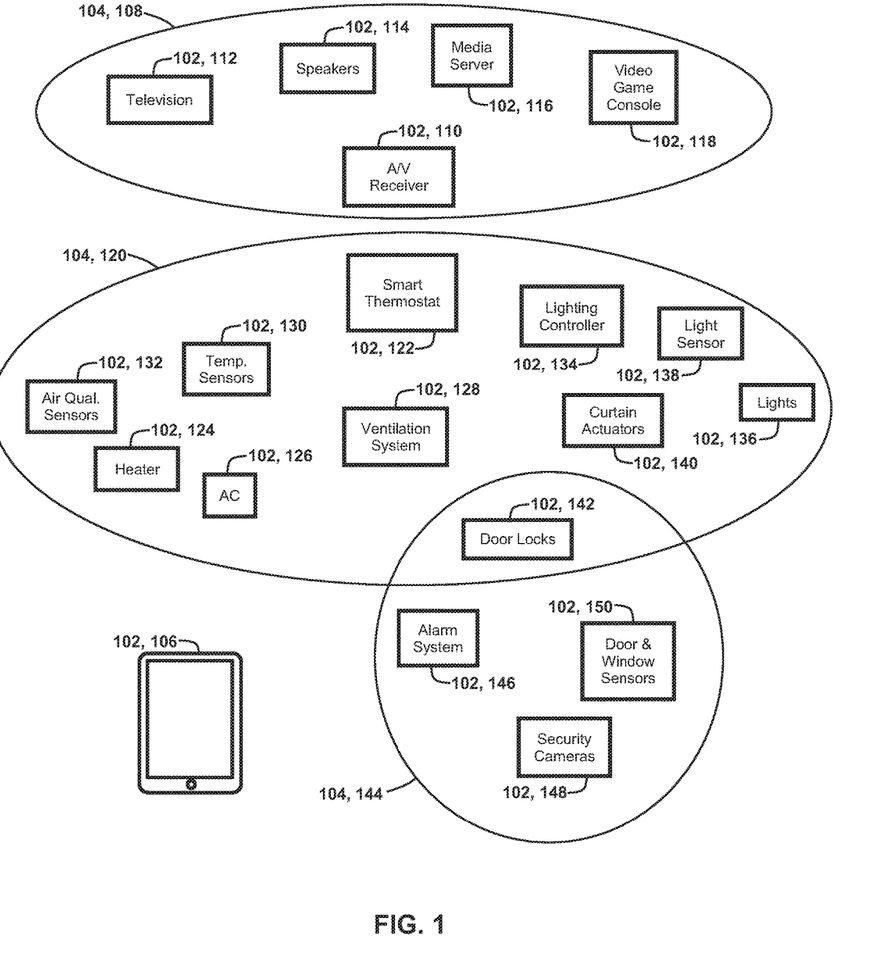
FIG. 1 shows one embodiment of a distributed system having several networked devices.

FIG. 1 shows a distributed system 100. The system 100 includes a plurality of devices 102. Each of the devices 102 includes embedded electronics and software configured to enable communications between the devices 102. The devices 102 may comprise machines, controllers, actuators, sensors, tablet computers, smartphones, laptops, or any other device configured with network connectivity.

By way of example, the system 100 is described in the context of a home. A home owner or tenant (hereinafter referred to as "the user") is enabled to easily establish one or more logical trust domains 104, which are referred to herein as "spheres." Each user-generated sphere 104 defines a group of trusted member devices 102 and/or services provided by the trusted member devices 102. The user-generated sphere 104 is associated with a shared secret, cryptographic key, or "sphere key", which is used to encrypt or otherwise secure communications between member devices 102 of the respective sphere 104. In this way, the devices 102 in the user's home can be grouped according to their purpose or application context and devices 102 within each user-defined sphere 104 can communicated with one another securely. As discussed in greater detail below, the user can create and manage the spheres 104 using an owner device 106, such as a smartphone or tablet computer. In some embodiments, each sphere 104 is associated with a human-readable description string that is chosen by user and reflects the scope or purpose of the sphere 104. Additionally, each sphere 104 may include a standardized identifier that corresponds to its scope or purpose, regardless of the human-readable description string chosen by the user.

For example, the user may choose to create a "Home Entertainment" sphere 108. The "Home Entertainment" sphere 108 may include several member devices 102, such as an A/V receiver 110, a television 112, speakers 114, a media server 116, and a video game console 118. The user may decide to provide access to the "Home Entertainment" sphere 108 to guests in his or her home, so that they can have access to various services provided by member devices 102 of the "Home Entertainment" sphere 108. For example, if the user throws a party at his or her home, then guests can be invited add their smartphones or other portable devices to the "Home Entertainment" sphere 108 so that the guests can control music playback from the speakers 114 with their smartphones, stream videos from their smartphones to the television 112, or participate in various other entertainment activities.

The user may also choose to, for example, create a "Home Automation" sphere 120. The "Home Automation" sphere 120 may include several member devices 102, such as a smart thermostat 122, a heater 124, an air conditioner 126, a ventilation system 128, temperature sensors 130, air quality sensors 132, a lighting controller 134, lights 136, light sensors 138, curtain actuators 140, and door locks 142. The user may decide to only provide family members and trusted guests, such as a babysitter, with access to the "Home Automation" sphere 120. An authorized member of "Home Automation" sphere 120 may have access to various services provided the member devices 102 of the "Home Automation" sphere 120, such as temperature and lighting control.

Finally, in this example, the user may decide to create a "Home Security" sphere 144. The "Home Security" sphere 144 may include several member devices 102, such alarm system 144, security cameras 146, door and window sensors 148, and door locks 142. The user may decide to only provide select family members, such as the heads of household, with access to the "Home Security" sphere 144. In this example, the door locks 142 are members of both the "Home Automation" sphere 120 and the "Home Security" sphere 144. However, the user may decide to limit the services of the door locks 142 that are authorized within the "Home Automation" sphere 120, while authorizing all of the services of the door locks 142 within the "Home Security" sphere 144. For example, the "Home Automation" sphere 120 may only have access to a proximity based unlocking service of the door locks 142, whereas the "Home Security" sphere 144 might also have access to a remote unlocking service of the door locks 142.

It is noted that, these particular spheres 104 and devices 102 are merely exemplary and are used to demonstrate a possible advantageous usage for the methods and systems described herein. As illustrated, the spheres 104 enable a user to easily provide access to certain devices 102, while not providing access to other devices 102. Additionally, the spheres 104 can be easily configured and re-configured based on the needs of the user.

As discussed above, the user can dynamically create and manage the spheres 104 using an owner device 106, such as a smartphone or tablet computer. The owner device 106 is not fundamentally different than any of the other devices 102 in the system 100, except that, in one embodiment, the owner device 106 includes a sphere management application that enables the user to create and manage the spheres 104. As used herein, the term "owner device" refers to a device 102 that is empowered to invite new devices 102 to join the respective sphere 104, is empowered to promote other devices 102 to have the authority to invite new devices 102, and is empowered to make another device 102 an owner device. In the exemplary system 100, the owner device 106 may be an owner device for all of all of the spheres 104 and is empowered to invite new devices 102 to join the each of the spheres 104. Additionally, the owner device 106 is empowered to promote other devices 102 within a respective sphere 104 so that they are also empowered to invite new devices 102 to join the respective spheres 104. As used herein, the term "promoted device" refer to member devices 102 within a sphere 104 that are empowered to invite new devices 102 to join the respective sphere 104, but that is not empowered to delegate the authority to invite new devices 102 to join the respective sphere 104. For example, the user might promote the A/V receiver 110 so that it is empowered to invite additional devices 102 to the "Home Entertainment" sphere 108 as required. Similarly, smart thermostat 122 and/or the lighting controller 134 might be promoted devices within the "Home Automation" sphere 120 and the alarm system 146 might be a promoted device within the "Home Security" sphere 144.

The creation of a sphere 104 enables communications between member devices 102 to be protected from any device that is not a member of the respective sphere 104. Each sphere 104 defines a group of trusted member devices 102 and is associated with a shared secret, cryptographic key, or "sphere key", which is used to encrypt or otherwise secure communications between member devices 102 of the respective sphere. Accordingly, a sphere 104 enables member devices 102 to securely communicate using unsecured and/or public network infrastructure, such as a local area network or the Internet. No additional security support or trust is required for the underlying network infrastructure and communication technology.

As discussed in further detail below, during creation of a sphere 104, the owner device 106 is configured to generate a sphere key for the respective sphere 104 and securely provide the sphere key to each of the member devices 102. Once the sphere 104 has been established, communications between the devices 102 of a respective sphere 104 are encrypted with the sphere key. In some embodiments, the sphere key is also used for encrypting information for storage. In some embodiments, different derived values from the sphere key are used in different contexts. Particularly, in one embodiment, a first derived value from the sphere key is used for encrypting communications between member devices 102 of the respective sphere 104 and a second derived value from the sphere key is used for encrypting information for storage.

In one embodiment, the owner device 106 also enables a user to select particular services of a device 102 the be joined into a sphere 104, while not allowing other services of the device 102 to be joined into the sphere 104. Particularly, if a particular device 102 offers several services or functions, then the device 102 may be a member of a particular sphere 104 with respect to a subset of the services provided by the device 102 that relate to the purpose of the particular sphere 104, but not a member of the sphere 104 with respect to certain other services provided by the device 102. Additionally, in one embodiment, when creating a new sphere 104, the user can select among various default sphere configuration profiles (e.g. private, entertainment, smart home) and apply default policies for the sphere 104 (e.g. auto-join all services on a newly joined device 102, or only manually join services).

Device Hardware

As discussed above, the devices 102 in the system 100 may include machines, controllers, actuators, sensors, computers, or any other device configured with network connectivity. The owner device 106 is also be considered one of the devices 102. The devices 102 can include hardware and functionalities that differ substantially from one another.

However, each device 102 generally at least includes electronics and software configured to enable communications at least one other device 102. In some embodiments, each of the devices 102 includes software for managing sphere membership and sphere communications. In one embodiment, the software is a middleware for managing sphere membership and sphere communications.

Figure 2:
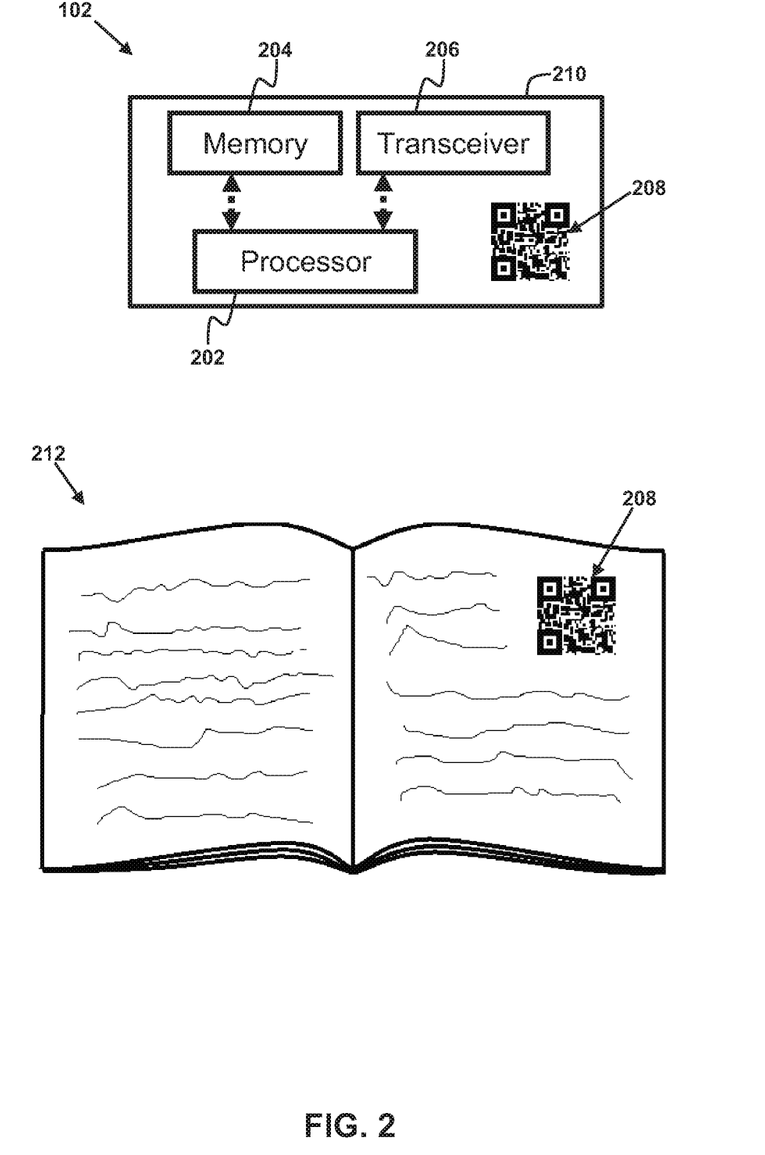
FIG. 2 shows an exemplary embodiment of a networked device in the system of FIG. 1.

FIG. 2 shows an exemplary embodiment of a most basic device 102. In one embodiment, each of the devices 102 comprises at least a processor 202, memory 204, and a transceiver 206. The memory 204 is configured to store program instructions that, when executed by the processor 202, enable the respective device 102 to perform one or more services or functions. The memory 204 may be of any type of device capable of storing information accessible by the processor 202, such as a memory card, ROM, RAM, write-capable memories, read-only memories, hard drives, discs, flash memory, or any of various other computer-readable medium serving as data storage devices as will be recognized by those of ordinary skill in the art. Additionally, it will be recognized by those of ordinary skill in the art that a "processor" includes any hardware system, hardware mechanism or hardware component that processes data, signals or other information. The processor 202 may include a system with a central processing unit, multiple processing units, dedicated circuitry for achieving functionality, or other systems. The device 102 may comprise many additional components for providing one or more services, such as sensing elements, actuators, interfaces, displays, etc.

The transceiver 206 may be any of various devices configured for communication with other electronic devices, including the ability to send communication signals and receive communication signals. The transceiver 206 may include different types of transceivers configured to communicate with different networks and systems. The transceiver 206 is at least configured to exchange data between the respective device 102 and further devices 102. In one embodiment, the transceiver 206 is configured to exchange data using a protocol such as Wi-Fi, Bluetooth, RFID, NFC, ZigBee, Z-Wave, or Ethernet.

In some embodiments, the memory 204 is configured to store software or firmware for operating the processor 202 and other hardware components to provide one or more services. Additionally, in one embodiment, the memory 204 stores middleware for managing sphere membership and sphere communications. In one embodiment, each of the services provided by the device 102 are automatically members of a default sphere for the particularly device 102. The default sphere differs from the user-generated spheres 104 in that the default sphere is specific to the particular device 102 and cannot be created or destroyed by the user. Each of the services provided by the device 102 can be joined to other user-generated spheres 104.

Once the device 102 has been joined into a user-generated sphere 104, the processor 202 is configured to encrypt outgoing messages to other member devices 102 in the sphere 104 using the respective sphere key for the sphere 104. In one embodiment, the messages include a message header having a sphere identifier. The sphere identifier is transmitted in unencrypted form so that the receiving device 102 can determined which sphere key is to be used for message decryption. Particularly, if a device 102 is a member of multiple spheres 104, the processor 202 is configured receive a message and read the sphere identifier from the message header. Based on the sphere identifier, the processor 202 is configured to select a corresponding sphere key and use the sphere key to decrypt a body of the message. In one embodiment, in order to ensure uniqueness of a sphere identifier, the sphere identifier is a combination of human-readable identifier with a unique device identifier of the device it was created on and/or an arbitrary number (such as a UUID) which may be created randomly or pseudo-randomly.

In some embodiments, the processor 202 is configured to store certain information related to a sphere 104 in the memory 204. In one embodiment, the processor 202 is configured to encrypt the information using the respective sphere key for the sphere 104 before storage on the memory 204. The information may comprise sensor data, or other operational data. In one embodiment, the messages exchanged between member devices 102 may include such data in their message bodies.

In some embodiments, a device 102 may have a very limited user interface or no user interface at all, which makes setup of the device 102 and inviting the device 102 to a sphere 104 more challenging. In one embodiment, the device 102 has a quick response code (QR code) or two-dimensional barcode 208 printed on a body 210 of the device 102. Alternatively, the device 102 may have another type of bar code, printed text (such as a printed URL or serial key), or RFID/NFC tag in substitution of the QR code 208. Additionally, more complex devices 102 may include a display device configured to display a dynamic or temporary QR code 208. The QR code 208 may include meta-data $META_D$, which may include configuration or setup information for the device 102. Alternatively, the QR code 208 may store references $R_j$, such as a URL, to such meta-data, which can be retrieved using the reference $R_j$ from an external source. In one embodiment, the meta-data $META_D$ includes a secret or key used for an initial set-up process, as will be discussed in further detail below. In one embodiment, the meta-data $META_D$ includes information regarding recommended spheres to which the device 102 can be added or other characteristic information that can be used to determine which spheres would be most appropriate for the device 102 to be added. In one embodiment, the QR code 208 is alternatively located in a user manual 212, a certificate of ownership, or other materials included with the device 102.

Figure 3:
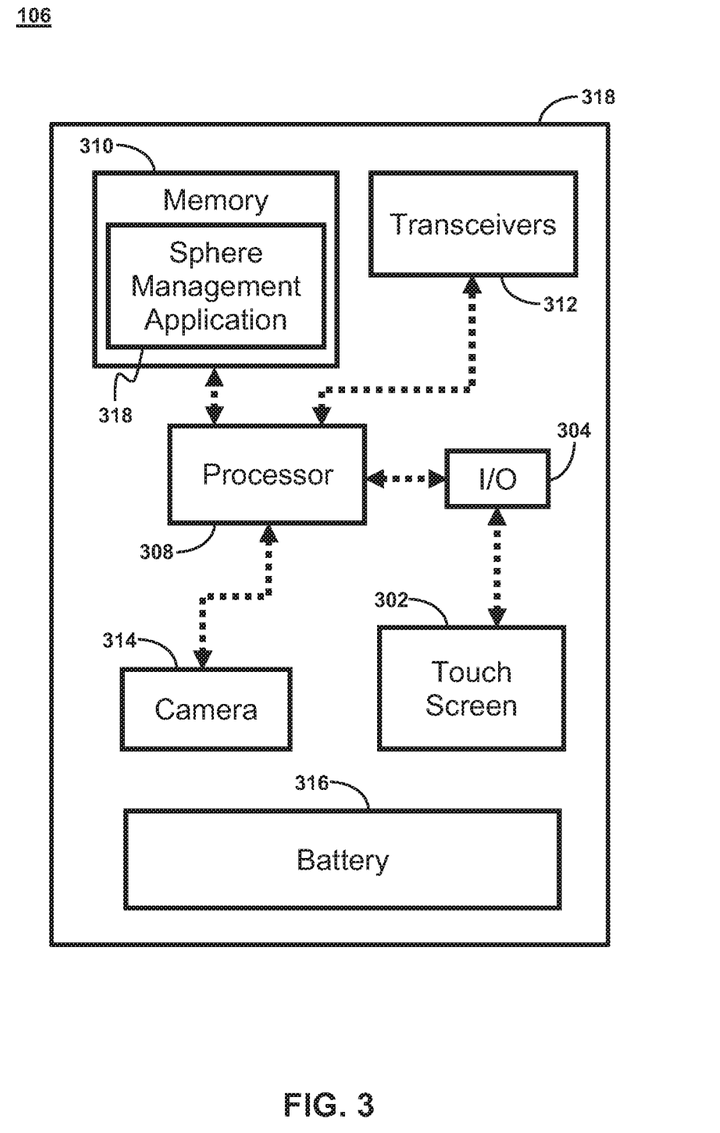
FIG. 3 shows one embodiment of the owner device of the system of FIG. 1.

FIG. 3 shows one embodiment of the owner device 106, in which it is embodied as a smartphone or tablet computer. The owner device 106 includes a touch screen 302, an input/output (I/O) interface 304, a processor 308, a memory 310, one or more transceivers 312, and a camera 314. The owner device 106 also includes a rechargeable battery 316 configured to power the electronic components within the owner device 106. The owner device 106 also includes a protective outer shell or housing 318 configured to retain and protect the electronic components positioned within the housing 318. As will be recognized by those of ordinary skill in the art, the components of the owner device 106 may vary. Alternative owner devices 106 may include much of the same functionality and components as the shown in FIG. 3 and/or may include others not listed. Additionally, some of the device 102 may also include very similar functionality and components as those described with respect to the owner device 106.

The touch screen 302 of the owner device 106 may be an LCD capacitive touch screen or any of various other screens appropriate for a smartphone or tablet computer. The I/O interface 304 of the owner device 106 is in communication with the touch screen 302 and includes software and hardware configured to facilitate communications with the user via the touch screen 302 and to visually display graphics, text, and other data to the user via the touch screen 302. In some embodiments, the camera 314 is any suitable device for at least reading the QR code 208, or equivalent, of a device 102. In some embodiments, the camera 314 may include video and sound recording functionalities.

The processor 308 of the owner device 106 may be any of various processors as will be recognized by those of ordinary skill in the art. The processor 308 is in communication with the I/O interface 304, the memory 310, the transceivers 312, and the camera 314, and is configured to deliver data to and receive data from each of these components. It will be recognized by those of ordinary skill in the art that a "processor" includes any hardware system, hardware mechanism or hardware component that processes data, signals or other information. A processor may include a system with a central processing unit, multiple processing units, dedicated circuitry for achieving functionality, or other systems.

The memory 310 is configured to store information, including data and program instructions for execution by the processor 308. In one embodiment, the memory 310 may include program instructions for a graphical user interface configured to provide a sphere management application 318. The processor 308 is configured to read the program instructions from the memory 310 and execute the program instructions to provide the sphere management application 318 to the user so for the purpose of creating and managing the spheres 104. The memory 310 may be of any type of device capable of storing information accessible by the processor, such as a memory card, ROM, RAM, write-capable memories, read-only memories, hard drives, discs, flash memory, or any of various other computer-readable medium serving as data storage devices as will be recognized by those of ordinary skill in the art. Program instructions stored on the memory 310, such as the sphere management application 318, may be downloaded from a network location, such as via the Internet.

The memory 310 may also store information regarding the currently established spheres 104. Particularly, in one embodiment, the memory 310 stores a local set of sphere configuration files $CONF_i$ for the spheres 104. Each of the local configuration files $CONF_i$ includes a group identifier $GRP_i$ and meta-information $GRPMETA_i$ for the respective sphere 104. The meta-information $GRPMETA_i$ at least includes a sphere key $SEC_i$ for the respective sphere 104 and information regarding member devices 102 of the respective sphere 104. In one embodiment, the meta-information GRPMETA$_i$ includes a reference $R_i$, such as a URL, to meta-information that is retrievable from an external source, such as a remote server accessible via the Internet. When a new sphere 104 is created, the processor 308 is configured to generate a new configured configuration file $CONF_i$ having a new group identifier $GRP_i$ and new sphere key $SEC_i$. The processor 308 is configured to store the new configuration file $CONF_i$ in the memory 310 or to store the new configuration file $CONF_i$ at the external source, while storing a new reference $R_i$ in the memory 310.

The transceivers 312 may be any of various devices configured for communication with other electronic devices, including the ability to send communication signals and receive communication signals. The transceivers 312 may include different types of transceivers configured to communicate with different networks and systems. In some embodiments, the transceivers 312 include at least one transceiver configured to allow the owner device 106 to perform wireless communications with cell towers of the wireless telephony network. In some embodiments, the transceivers 312 include at least one transceiver configured to allow the owner device 106 to communicate with any of various local area networks using Wi-Fi, Bluetooth, Ethernet, or any of various other communications schemes.

Methods for operating the owner device 106 and/or the devices 102 are described below. In the description of the methods, statements that a method is performing some task or function refers to a controller or general purpose processor executing programmed instructions stored in non-transitory computer readable storage media operatively connected to the controller or processor to manipulate data or to operate one or more components in the system 100 to perform the task or function. Particularly, the processor 308 of the owner device 106 and/or the processor 202 of a device 102 above may be such a controller or processor. Alternatively, the controller may be implemented with more than one processor and associated circuitry and components, each of which is configured to form one or more tasks or functions described herein. Additionally, the steps of the methods may be performed in any feasible chronological order, regardless of the order shown in the figures or the order in which the steps are described.

Some or all of the methods discussed herein may be implemented as software that is stored in the memory 204 of each device 102 and executed by the processor 202. In particular, in one embodiment, the software that is stored in the memory 204 at least includes middleware for managing sphere membership of the device 102 and sphere communications with other devices 102. In the case of more sophisticated devices 102, such as the owner device 106, the software may also include the sphere management application 318, which is executed by the processor 308 to provide a graphical user interface (GUI) for creating and managing the spheres 104.

Creating a New Sphere

Figure 4:
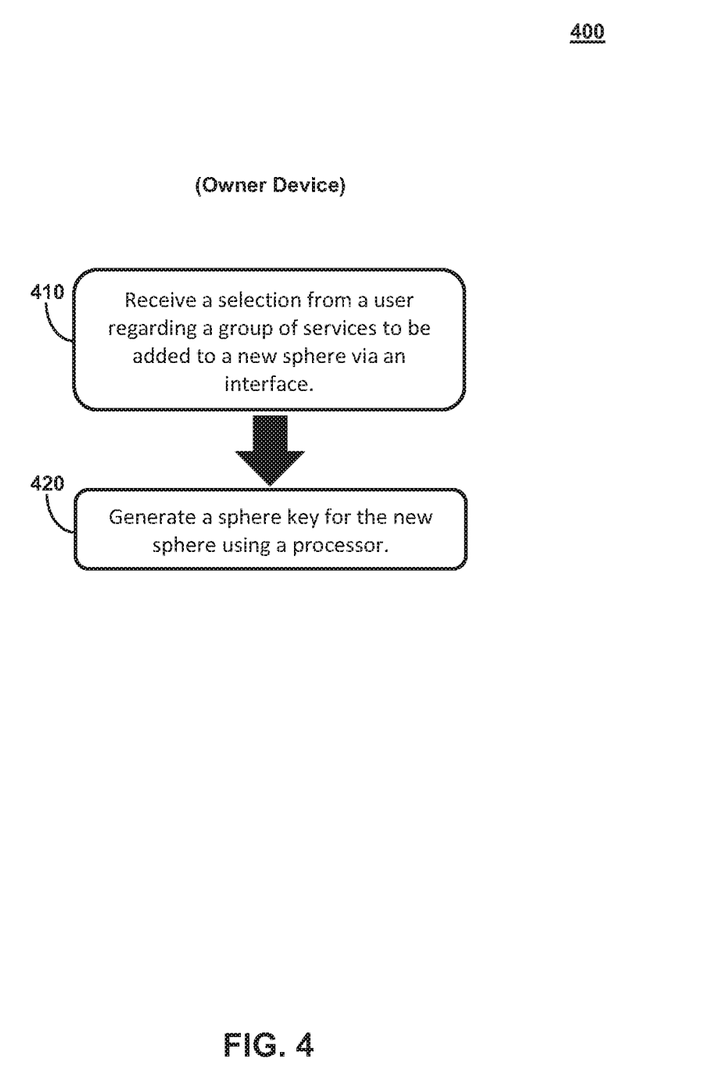
FIG. 4 shows a method for creating a new user-generated sphere.

FIG. 4 shows a method 400 for creating a new user-generated sphere 104 for the system 100. As discussed above, each of the devices 102, including the owner device 106, is configured to provide one or more services. In some embodiments, all of the services of a particular device 102 are automatically members of the default sphere for the particular device 102. However, the method 400 enables a device 102, such as the owner device 106, to create a new user-generated sphere 104 which can include services from multiple member devices 102.

The method 400 begins with receiving a selection from a user regarding a group of services to be added to a new sphere via an interface (block 410). Particularly, with respect to the embodiments disclosed in detail herein, the processor 308 of the owner device 106 is configured to operate the I/O interface 304 to receive a selection regarding a group of the services of the owner device 106 that are to be added to a newly created sphere 104. In one embodiment, the processor 308 executes program instructions of the sphere management application 318 to display a GUI on the touch screen 302. The processor 308 is configured to provide a list of services provided by the owner device 106 via the GUI on the touch screen 302. The user selects a group of the services provided by the owner device 106 to be joined into a new sphere 104. The selection can include all of the services of the owner device 106, some of the services of the owner device 106, or even none of the services of the owner device 106. In one embodiment, the GUI allows the user to enter a human-readable string that identifies the newly created sphere 104 (i.e. a name for the sphere 104). In one embodiment, the GUI allows the user to select among various default sphere configuration profiles (e.g. private, entertainment, smart home) and apply default policies for the sphere 104 (e.g. auto-join all services on a newly joined device 102, or only manually join services).

Once the selection regarding the group of services has been received from the user, the method 400 continues by generating a sphere key for the new sphere using a processor (block 420). Particularly, the processor 308 of the owner device 106 is configured to generate a sphere key $SEC_i$ for the newly created sphere 104. In one embodiment, the sphere key $SEC_i$ comprises a very long number or alphanumeric string that is generated randomly or pseudo-randomly. In one embodiment, the processor 308 is configured to generate a new configured configuration file $CONF_i$ having a new group identifier $GRP_i$ and the new sphere key $SEC_i$. In one embodiment, the processor 308 is configured to store the new configuration file $CONF_i$ in the memory 310 or to store the new configuration file $CONF_i$ at the external source, while storing a new reference $R_i$ in the memory 310.

Inviting Additional Devices to a User-Generated Sphere

Once a new sphere 104 has been created by the owner device 106, additional services provided by other devices 102 can be invited to the newly created sphere 104. Particularly, the owner device 106 can invite another device 102 to join the newly created sphere 104 and to share one or more of its services with the newly created sphere 104.

Figure 5:
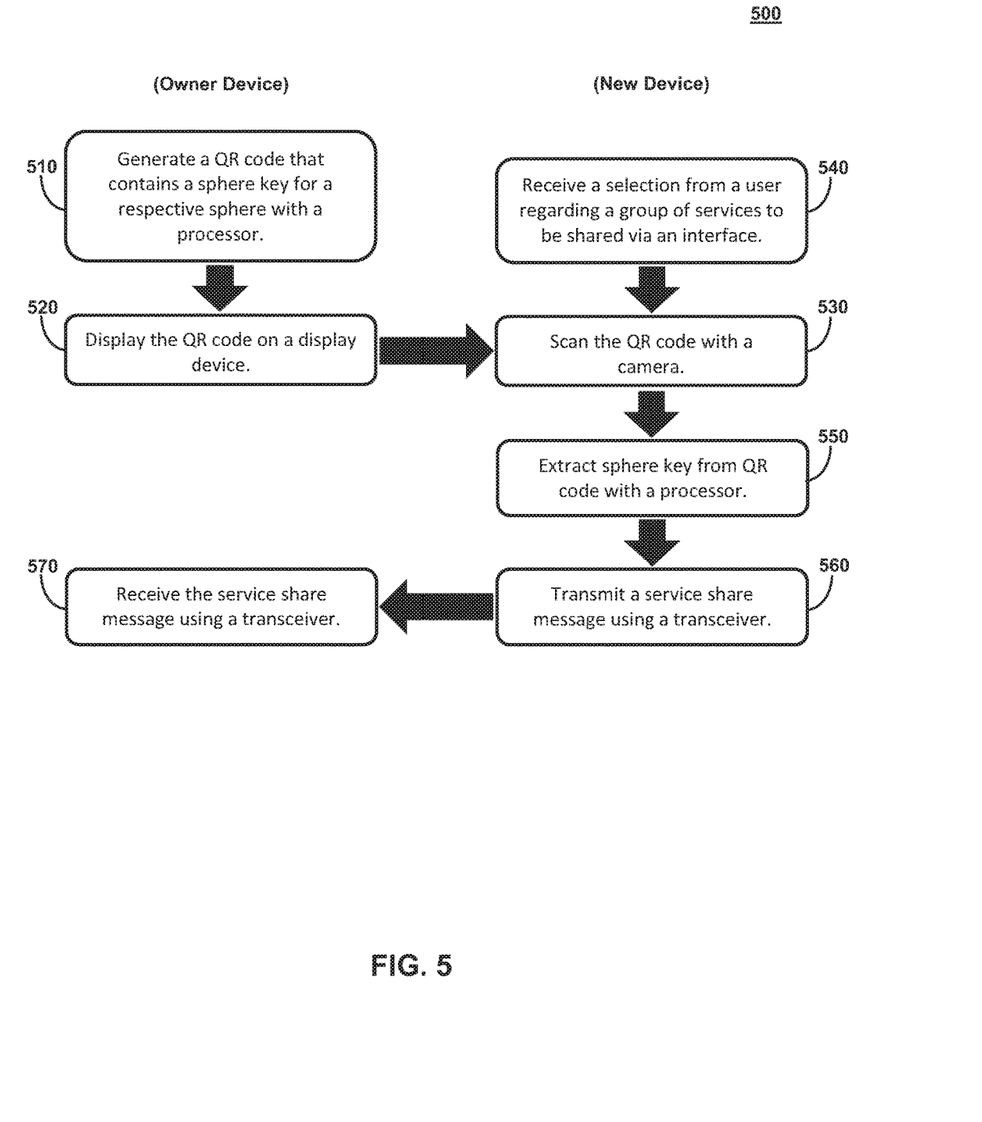
FIG. 5 shows a method for inviting a new device to join a user-generated sphere.

FIG. 5 shows a method 500 for inviting a new device 102 to join a user-generated sphere 104. The method 500 begins by generating a QR code that contains a sphere key for a respective sphere with a processor of the owner device (block 510). Particularly, the processor 308 of the owner device 106 is configured to generate a QR code that contains the sphere key $SEC_i$ for a respective sphere 104. In some embodiments, the QR code contains additional information regarding the respective sphere 104, such as the human-readable string that identifies the sphere 104, a list of services provided by the sphere 104, and the identity of the owner of the sphere 104. In some embodiments, the QR code is any other type of marking that comprises machine-readable optical representation of data, or simply a text string, such as a serial key.

Next, the method 500 continues by displaying the QR code on a display device of the owner device (block 520). Particularly, the processor 308 of the owner device 106 is configured to operate the I/O interface 304 to display the QR code on the touch screen 302. In one embodiment, the processor 308 executes program instructions of the sphere management application 318 to display a GUI on the touch screen 302 that includes that QR code. Alternatively, the processor 308 is configured to display another type of bar code or a text string on the touch screen 302.

Once the QR code is displayed by the owner device 106, new devices 102 can scan the QR code in order to join the sphere 104. Particularly, the method 500 continues by scanning the QR code with a camera of the new device (block 530). The new device 102 may be a device owned by a guest that is essentially similar to the owner device 106, or the new device 102 may be completely different type of device, such as the A/V receiver 110 discussed with respect to FIG. 1. In one embodiment, the processor 202 of the new device 102 is configured to operate a camera or equivalent device to scan the QR code or other type of barcode from the owner device 106. In other embodiments in which a text string is used in substitution of the QR code, the processor 202 is configured to operate an I/O device to receive an input of the text string via an interface.

Prior to or after scanning the QR code, the method 500 optionally continues with receiving a selection from a user regarding a group of services of the new device to be shared with the sphere via an interface of the new device (block 540). Particularly, the processor 202 of the new device 102 is configured to receive via an interface a selection regarding a group of services of the new device 102 that are to be shared with the sphere 104. In one embodiment, the processor 202 is configured to provide a list of services provided by the new device 102 via a GUI on a display of the new device 102. The user selects a group of the services provided by the new device 102 to be shared with the sphere 104. The selection can include all of the services of the new device 102, some of the services of the new device 102, or even none of the services of the new device 102.

After scanning the QR code, the method 500 continues by extracting the sphere key from the QR code with a processor of the new device (block 550). Particularly, the processor 202 of the new device 102 is configured to extract the sphere key $SEC_i$ for the sphere 104 from the scanned QR code or the received text string. In one embodiment, the processor 202 is configured to store the sphere key $SEC_i$ for the sphere 104 in the memory 204.

Next, the method 500 continues by transmitting a service share message using a transceiver of the new device (block 560). Particularly, the processor 202 of the new device 102 is configured to operate the transceiver 206 to transmit a service share message to the owner device 106 that indicates which services of the new device 102 are shared with the sphere 104. Next, the method 500 continues by receiving the service share message using a transceiver of the owner device (block 570). Particularly, the processor 308 of the owner device is configured to operate the transceivers 312 to receive the service share message from the new device 102. In one embodiment, in response to the service share message, the processor 308 is configured to operate the I/O interface 304 to show a GUI on the touch screen 302 prompting a user to select which of the shared services are to be allowed into the sphere 104. In one embodiment, the processor 308 is configured to operate the transceivers 312 to broadcast a notification to all member devices 102 of the sphere 104 that indicates that the new device 102 has been added to the sphere and indicates which services of the new device 102 have been shared with the new sphere 104.

In some cases, the new device 102 may not have any camera or other interface for scanning a QR code or inputting a text string. For example, some devices 102 may have a display capable of displaying a QR code, but no camera for scanning a QR code. Furthermore, very simple devices 102 such as sensors and actuators will likely have no interface at all. Accordingly, another process is be used to invite such devices 102 to a sphere.

Figure 6:
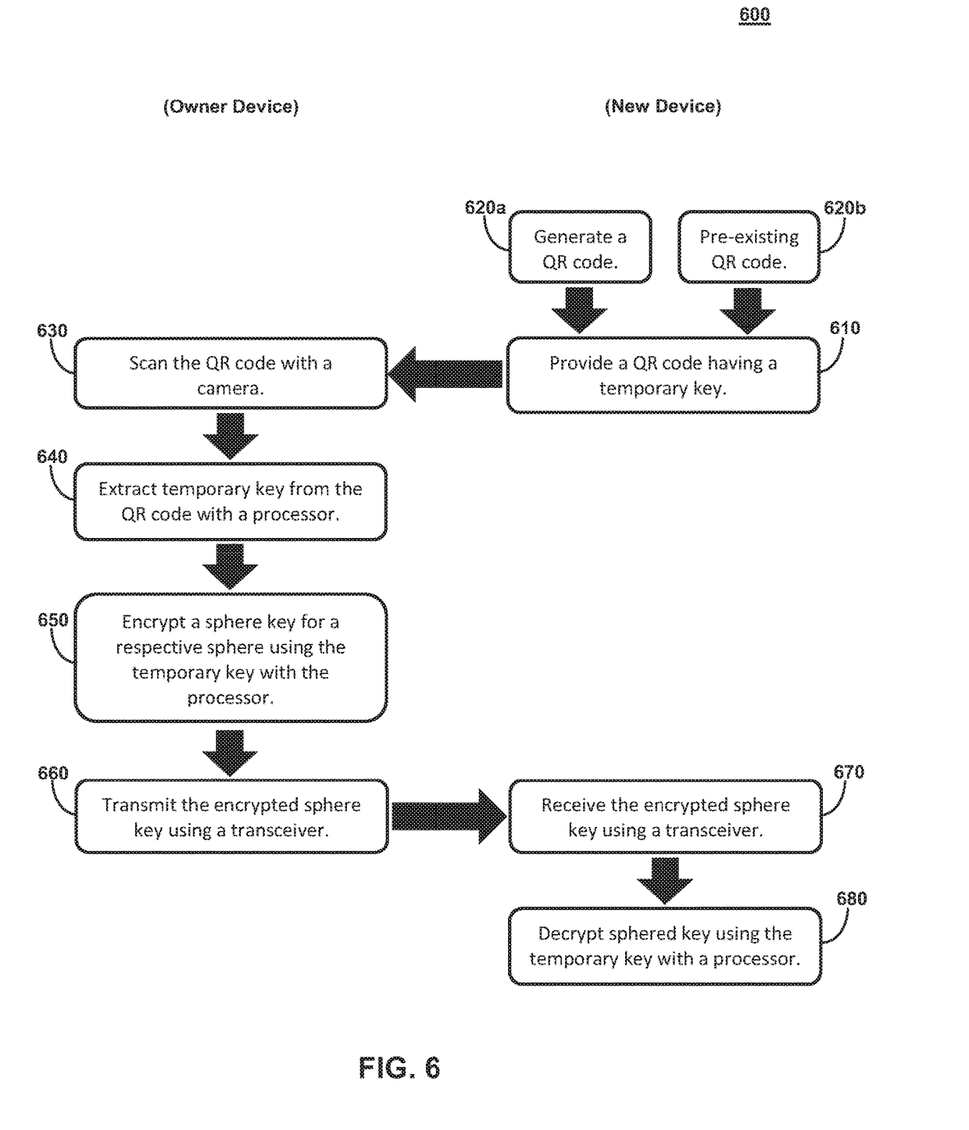
FIG. 6 shows an alternative method for inviting a new device to a user-generated sphere.

FIG. 6 shows an alternative method 600 for inviting a new device 102 to a user-generated sphere 104. The method 600 begins with providing a QR code having a temporary key associated with the new device to be invited or added to a respective sphere (block 610). In some embodiments, the new device 102 is configured to generate and display a QR code that includes a temporary cryptographic key (block 620a). Particularly, the processor 202 of the new device 102 is configured to generate a QR code that includes the temporary cryptographic key and to display the QR code on a display device of the new device 102. However, in some embodiments, the new device 102 does not have any display device that can display a QR code. Accordingly, in some embodiments, a pre-existing QR code is already associated with the new device and includes a temporary cryptographic key (block 620b). Particularly, as described above with respect to FIG. 2, the new device 102 may have a QR code 208 printed directly onto a housing of the new device 102 or printed in a user manual 212 or other associated documents. In another embodiment, a third device can be used to generated or display the QR code having the temporary cryptographic key.

Next, the method 600 continues by scanning the QR code with a camera of the owner device (block 630). Particularly, the processor 308 of the owner device 106 is configured to operate the camera 314 to read the QR code that is displayed by or otherwise associated with the new device 102. Next, the method 600 continues by extracting the temporary key from the QR code with a processor of the owner device (block 640). Particularly, the processor 308 is configured to extract the temporary cryptographic key from the QR code.

Once the owner device has obtained the temporary cryptographic key, the method 600 continues by encrypting a sphere key for a respective sphere using the temporary cryptographic key with a processor of the owner device (block 650). Particularly, the processor 308 is configured to use the temporary cryptographic key to encrypt the sphere key $SEC_i$ for the sphere 104 to which the new device 102 is to be invited or added. Next, the method 600 continues by transmitting the encrypted sphere key using a transceiver of the owner device (block 660). Particularly, the processor 308 of the owner device 106 is configured to operate the transceivers 312 to transmit the encrypted sphere key $SEC_i$ for the sphere 104 to the new device 102. In one embodiment, the encrypted sphere key $SEC_i$ is transmitted via an unsecured network, such as a local area network.

In embodiment, the owner device 106 is configured to prompt the user to decide which sphere 104 to which the new device 102 should be added. Particularly, the processor 308 executes program instructions of the sphere management application 318 to display a GUI on the touch screen 302 which provides a list of spheres to which the new device 102 can be added. The user selects at least one of the spheres and the owner device 106 transmits the respective sphere key $SEC_i$ to the new device 102. In one embodiment, the owner device 106 is configured to automatically select a sphere for the new device 102 with reference to the metadata $META_D$ of the QR code, which includes information regarding recommended spheres to which the new device 102 can be added or other characteristic information that can be used to determine which spheres would be most appropriate for the device 102 to be added.

Next, the method 600 continues with receiving the encrypted sphere key using a transceiver of the new device (block 670). Particularly, the processor 202 of the new device is configured to operate the transceiver 206 to receive the encrypted sphere key $SEC_i$ from the owner device 106. Finally, the method 600 continues with decrypting the sphere key using the temporary key with a processor of the new device (block 680). Particularly, the processor 202 of the new device 102 is configured to decrypt the sphere key $SEC_i$ for the sphere 104 using the temporary cryptographic key. In one embodiment, the processor 202 is configured to store the sphere key $SEC_i$ for the sphere 104 in the memory 204. In one embodiment, the processor 202 is configured to operate the transceivers 312 to transmit a notification to the owner device 106 or to all member devices 102 of the sphere 104 that the new device 102 has been successfully added to the sphere.

In other embodiments, Diffie-Hellman key exchange and/or Encrypted Key Exchange (EKE) processes are used to provide the sphere key $SEC_i$ of a respective sphere 104 to a new devices 102. In one embodiment, the processor 202 of a new device 102 is configured operate the respective transceiver 206 to transmit a public key to the owner device 106 via an unsecured network, such as a local area network. The processor 308 of the owner device 106 is configured to operate the transceivers 312 to receive the public key from the new device 102. Next, the processor 308 of the owner device 106 is configured to encrypt a sphere key $SEC_i$ for the a respective sphere 104 using the public key and operate the transceivers 312 to transmit the encrypted sphere key $SEC_i$ to via the unsecured network, such as the local area network. Finally, the processor 202 of the new device 102 is configured operate the respective transceiver 206 to receive the encrypted sphere key $SEC_i$ and to decrypt the sphere key $SEC_i$ using a private key known only to the new device 102.

Secure Sphere Communications

Once devices 102 have been added into a sphere 104, the devices 102 are configured to encrypt communications between member devices 102 using the sphere key $SEC_i$ for the respective sphere 104. Particularly, with respect to the embodiments disclosed in detail herein, the processor 202 of each device 102 in the respective sphere 104 is configured to encrypt communications between it and other devices 102 in the newly created sphere 104 using the sphere key $SEC_i$ for the respective sphere 104. As discussed above, the messages may include a message header that includes a sphere identifier for the respective sphere 104, which is transmitted in unencrypted form. When a member device 102 receives a message, the processor 202 is configured read the sphere identifier from the message header. In response to the message header including the sphere identifier for the respective sphere 104, the processor 202 is configured to use the sphere key $SEC_i$ for the respective sphere 104 to decrypt a body of the message. Additionally, in one embodiment, the processor 202 is configured to encrypt information relating to the respective sphere 104 using the sphere key $SEC_i$ for the respective sphere 104 before storage in the memory 204.

Sphere Membership and Service Discovery

Member devices 102 can perform a discovery process in order to determine which other devices 102 are members of a respective sphere 104 and determine which services of the devices 102 are shared with the respective sphere 104. Particularly, in one embodiment, the processor 202 of a device 102 is configured to operate the transceiver 206 to broadcast or multicast a discovery request message to other devices 102 on the network. In one embodiment, the discovery request message is encrypted using the sphere key $SEC_i$ for the sphere 104, so that only member devices 102 of the sphere 104 will understand and respond to the message.

In response to receiving a discovery request message, the processor 202 of a member device 102 is configured to operate the transceiver 206 to transmit a discovery response message to the discovery requesting device 102 that identifies the member device 102 and all services of the member device 102 that are shared with the particular sphere. In one embodiment, the discovery response message is also encrypted using the sphere key $SEC_i$ for the sphere 104. In one embodiment, the discovery response message is broadcasted or multicasted so that all member devices 102 are updated with current information regarding sphere membership and the services available in the sphere 104.

In some embodiments, the member devices 102 are configured to periodically (such as every 5 or 10 seconds) broadcast or multicast discovery response messages in order to provide a heartbeat of service status in the sphere 104. Alternatively, the owner device 106 for the sphere 104 may be configured to periodically (such as every 5 or 10 seconds) broadcast a service update message that identifies all services available in the sphere 104.

Promotion of Member Devices

As discussed above, in some embodiments, devices 102 other than the owner device 106 can be promoted within a particular sphere 104 and empowered to invite new devices 102 to join the respective sphere 104. As used herein, the term "promoted device" refer to member devices 102 within a sphere 104 that are empowered to invite new devices 102 to join the respective sphere 104. In some embodiments, a promoted device is also empowered to promote other devices 102 within the sphere and are, accordingly, essentially an owner device.

Figure 7:
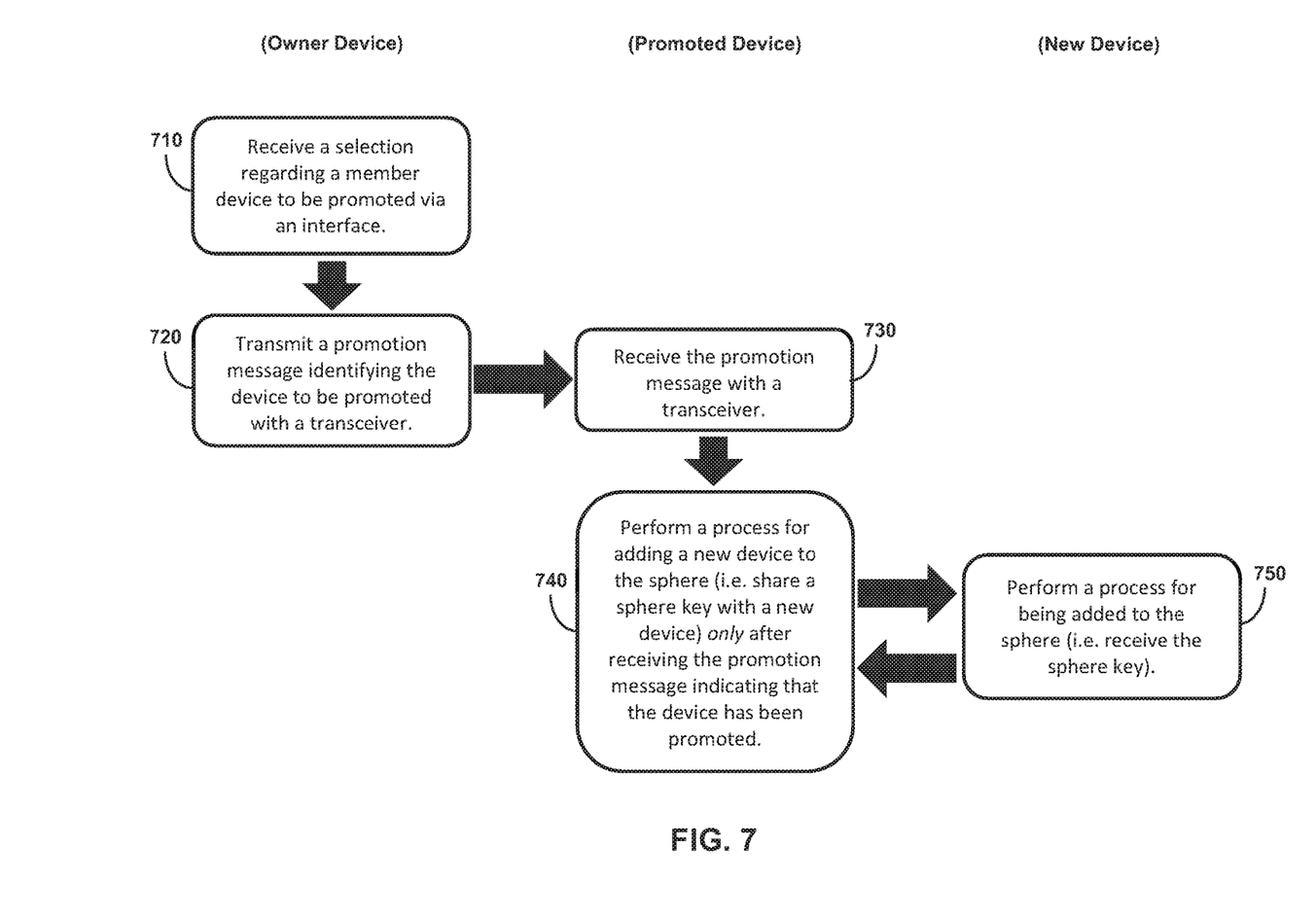
FIG. 7 shows a method of delegating authority to invite new devices to a sphere.

FIG. 7 shows a method 700 of delegating authority to invite new devices to a sphere. The method 700 begins by receiving a selection regarding a member device of a sphere to be promoted via an interface of the owner device (block 710). Particularly, with respect to the embodiments disclosed in detail herein, the processor 308 of the owner device 106 is configured to operate the I/O interface 304 to receive a selection regarding a member device 102 of a particular sphere 104 that is to be promoted within the respective sphere 104. In one embodiment, the processor 308 executes program instructions of the sphere management application 318 to display a GUI on the touch screen 302 to provide a list of member devices 102 that can be promoted. The user selects a member device 102 to be promoted using the touch screen 302.

Next, the method 700 continues by transmitting a promotion message identifying the device to be promoted with a transceiver of the owner device (block 720). Particularly, the processor 308 is configured to operate the transceivers 312 to transmit a promotion message to the device 102 that corresponds to the selection from the user regarding which member device 102 is to be promoted. The promotion message indicates that device 102 to be promoted is authorized to share the sphere key $SEC_i$ for a respective sphere 104 with new devices 102 in order to invite the new devices 102 to the sphere 104 (i.e. the device has inviting authority for the respective sphere). In one embodiment, the promotion message is encrypted and transmitted to the device 102 to be promoted using a public key and private key mechanism.

Next, the method 700 continues by receiving the promotion message with a transceiver of the device to be promoted (block 730). Particularly, the processor 202 of the device 102 to be promoted is configured to operate the transceiver 206 to receive the promotion message. In one embodiment, the promotion message is received and decrypted according to a public key and private key mechanism. In one embodiment, the processor 202 of the promoted device 102 is configured operate the transceiver 206 to transmit a promotion acknowledgement message to the owner device 106 in response to receiving the promotion message from the owner device 106.

Next, the method 700 continues by performing a process for inviting or adding a new device to the sphere with the promoted device only after receiving the promotion message indicating that the device has been promoted (blocks 740 and 750). Particularly, the processor 202 of the promoted device 102 is configured to perform a process for inviting or adding a new device 102 to the sphere only after receiving a promotion message from the owner device 106 or another device 102 that is authorized to promote new device 102. As discussed above, the sphere key $SEC_i$ for a respective sphere 104 is transmitted or otherwise shared with a new device 102 in order to invite or add the new device 102 to the sphere 104. Accordingly, the processor 202 of the promoted device 102 is configured to share the sphere key $SEC_i$ for a respective sphere 104 with a new device 102 only after receiving a promotion message from the owner device 106. If a promotion message has not been received by the device 102, then the processor 202 is configured to never share the sphere key $SEC_i$ with any other devices 102. The sphere key $SEC_i$ for a respective sphere 104 can be shared using the one of methods 500 and 600 or by any other key exchange method, as discussed above.

In one embodiment, the promotion message may also indicate that the device 102 is authorized to delegate authorization to share the shared key other devices 102. In other words, the promotion message can indicate that the device to be made an owner device which also has the authority to promote other devices. The device 102 that has been made an owner device can be used the method 700 to further delegate authority to invite new devices 102. Particularly, the processor 202 of the device 102 to be made an owner device is configured to operate the transceiver 206 to transmit a further promotion message to a further device 102 in the sphere 104 only after receiving the promotion message indicating that the device is authorized to delegate authorization to share the shared key other devices 102. In this way, the authority to promote other devices 102 is delegated, as well as the authority to invite other devices 102.

In some embodiments, a public-private key pair may be used to authenticate a promoted device 102. Particularly, when a sphere 104 is generated, the owner device 106 is configured to generate a public-private key pair for the sphere 104. When the owner device 106 promotes another device 102 with the authority to invite new devices 102 to a respective sphere 104, the owner device 106 is configured to generate a certificate or cryptographic signature using the private key, which is transmitted with the promotion message to the device 102 to be promoted. In some embodiment, the certificate or cryptographic signature is generated based on or otherwise certifies the sphere key $SEC_i$. In one embodiment, the certificate or cryptographic signature is further based on or otherwise certifies the identity of a promoted device (e.g. using a unique hardware identifier of the promoted device). When the promoted device 102 invites a new device 102 to join the respective sphere 104, the promoted device 102 is configured to transmit the certificate or cryptographic signature, which was signed by the owner device 106, to the new device 102. The new device 102 is configured to authenticate the sphere key $SEC_i$ and the identity of the promoted device 102 using the received certificate or cryptographic signature and the public key.

Alternatively or in addition, in some embodiments, each device 102 includes trusted hardware (e.g. a trusted platform module or a secure boot mechanism) configured to enforce that devices 102 which have not received a valid promote message cannot share the sphere key or promote other devices 102. Enforcement can also be performed using anti-debugging measures such as signatures or checksums.

Other Changes to Sphere Membership

In some circumstances, a device 102 may leave a sphere 104. Particularly, in some embodiments, if a device 102 is to leave a sphere 104, then the processor 202 of the leaving device 102 is configured to operate the transceiver 206 to transmit a leave message indicating that the device 102 is leaving the sphere 104. In one embodiment, the leave message is transmitted only to the owner device 106 of the sphere 104. In one embodiment, the leave message is encrypted and transmitted to the owner device 106 using a public key and private key mechanism. Alternatively, in other embodiments, the leave message is broadcast or multicast to all member devices 102. In one embodiment, processor 308 of the owner device 106 is configured operate the transceivers 312 to transmit a leave acknowledgement message to the leaving device 102.

In some circumstances, a device 102 may be expelled from a sphere 104 without its knowledge. Particularly, in some embodiments, if a device 102 is to be expelled from a sphere 104, then the processor 308 of the owner device 106 is configured to generate a new sphere key $SEC_i$ for the respective sphere 104 and distribute the new sphere key $SEC_i$ to all member devices 102 other than the expelled device 102. In one embodiment, the processor 308 of the owner device 106 is configured operate the transceivers 312 to transmit a sphere change message to all member devices 102 other than the expelled device 102 that indicates that a new sphere key will be provided. Subsequently, the processor 308 of the owner device 106 is configured operate the transceivers 312 to transmit the new sphere key $SEC_i$ for the respective sphere 104 to all member devices 102 other than the expelled device 102. In one embodiment, the new sphere key $SEC_i$ is encrypted and transmitted to all member devices 102 other than the expelled device 102 using a public key and private key mechanism. In one embodiment, after receiving the new sphere key $SEC_i$, the processors 202 of the remaining member devices 102 are configured to transmit a sphere change confirmation message to the owner device. In one embodiment, after receiving the new sphere key $SEC_i$, the processors 202 of the remaining member devices 102 are configured to delete the old sphere key $SEC_i$ from the memory 204 and store the new sphere key $SEC_i$ in the memory 204.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a first device in a group of devices in a network, the method comprising:
    encrypting and decrypting, with a processor of the first device, communications with other devices in the group of devices using a shared key that is stored in a memory of each device in the group of devices;
    receiving, with a transceiver of the first device, a first message from a second device in the group of devices, the first message indicating that the first device is authorized to share the shared key;
    transmitting, with the first device, the shared key to a third device in the network that is not in the first group of devices only after receiving the first message indicating that the first device is authorized to share the shared key, the transmission of the shared key to the third device further comprising:
        generating a marking with the processor of the first device, the marking being a machine-readable optical representation of (i) the shared key and (ii) a first list of services that are provided by devices in the group of devices and are accessible with the shared key; and
        displaying the marking on a display of the first device;
    receiving, with the transceiver of the first device, a second message from the third device, the second message including a second list of services that are provided by the third device and are accessible with the shared key;
    displaying a graphical user interface on the display of the first device configured to prompt a selection of at least one service from the second list of services to be made accessible with the shared key; and
    receiving inputs indicating the selection of at least one service from the second list of services.

2. The method of claim 1, further comprising:
    broadcasting, with the transceiver of the first device, a third message to all devices in the group of devices, the third message indicating that the selected at least one service from the second list of services is provided by the third device and is accessible with the shared key.

3. The method of claim 1, the generating of the marking further comprising:
    generating a barcode with the processor of the first device, the barcode being a machine-readable optical representation of (i) the shared key and (ii) the first list of services that are provided by devices in the group of devices and are accessible with the shared key.

4. The method of claim 1, further comprising:
    receiving, with a transceiver of the first device, the first message from the second device in the group of devices, the first message further indicating that the first device is authorized delegate authorization to share the shared key; and
    transmitting, with the first device, a second message to a fourth device in the network that is in the first group of devices only after receiving the first message indicating that the first device is authorized delegate authorization to share the shared key, the second message indicating that the fourth device is authorized to share the shared key.

5. The method of claim 1, further comprising:
    transmitting, with the first device, a cryptographic signature generated by the second device to the third device, wherein the first message received from the second device includes the cryptographic signature generated by the second device.

6. A first device comprising:
    a transceiver configured to communicate with other devices in a network;
    a display; and
    a processor operably connected to the transceiver and the display and configured to:
        encrypt and decrypt communications with other devices in a group of devices in the network using a shared key that is stored in a memory of each device in the group of devices;
        operate the transceiver to receive a first message from a second device in the group of devices, the first message indicating that the first device is authorized to share the shared key; and
        transmit the shared key to a third device in the network that is not in the first group of devices only after receiving the first message indicating that the first device is authorized to share the shared key, to perform the transmission of the shared key the processor is further configured to:
            generate a marking, the marking being a machine-readable optical representation of (i) the shared key and (ii) a first list of services that are provided by devices in the group of devices and are accessible with the shared key; and
            operate the display to display the marking;
        operate the transceiver to receive a second message from the third device, the second message including a second list of services that are provided by the third device and are accessible with the shared key;

operate the display to show a graphical user interface configured to prompt a selection of at least one service from the second list of services to be made accessible with the shared key; and receive inputs indicating the selection of at least one service from the second list of services.

7. The first device of claim 6, the processor being further configured to:

operate the transceiver to broadcast a third message to all devices in the group of devices, the third message indicating that the selected at least one service from the second list of services is provided by the third device and is accessible with the shared key.

8. The first device of claim 6, wherein the marking is a barcode.

9. The first device of claim 6, the processor being further configured to:

operate the transceiver to receive the first message from the second device in the group of devices, the first message further indicating that the first device is authorized delegate authorization to share the shared key; and transmit a second message to a fourth device in the network that is in the first group of devices only after receiving the first message indicating that the first device is authorized delegate authorization to share the shared key, the second message indicating that the fourth device is authorized to share the shared key.

10. The first device of claim 6, the processor being further configured to:

transmit a cryptographic signature generated by the second device to the third device, wherein the first message received from the second device includes the cryptographic signature generated by the second device.

* * * * *